Dec. 1, 1942.  J. M. DE BELL  2,303,826
METHOD OF PREVENTING STICKING OF VINYL RESIN SHEETS
Filed Sept. 3, 1938

Inventor
John M. DeBell
By Pike, Calver & Gray
Attorneys.

Patented Dec. 1, 1942

2,303,826

UNITED STATES PATENT OFFICE 2,303,826

METHOD OF PREVENTING STICKING OF VINYL RESIN SHEETS

John M. De Bell, Longmeadow, Mass., assignor to Monsanto Chemical Company, St. Louis, Mo., a corporation of Delaware Application September 3, 1938, Serial No. 228,444

12 Claims. (Cl. 154—2)

My present invention has for its object the means of preventing the adhesion to each other of superposed layers of sticky, tacky, polyvinyl acetal resin plastic or the like. The polyvinyl acetal resins such as are described in the patent to Morrison, Skirrow & Blaikie, Reissue No. 20,430, dated June 29, 1937, when plasticized with suitable plasticizers, for instance, dibutyl phthalate, triethylene glycol dihexoate, tributyl phosphate, diethyl phthalate and dibutyl sebacate, etc., in proportions suitable for safety glass interlayers, are extremely sticky and tacky. This material is conveniently referred to as polyvinyl acetal resin plastic and is used in the manufacture of laminated glass and is produced in the form of sheets or rolls for shipment to the manufacture. Since in the manufacture of laminated glass it is essential that the gauge of the material shall be extremely accurate and be uniform throughout the entire surface of the sheet, and since pulling the sheet stretches it and produces variations in gauge which persist for a considerable length of time, and because if the sheets in a bundle or pack stick together or the successive layers in a roll adhere to each other, and because it is necessary to pull the sheet to separate them, the sticky, tacky character of the material is a matter of serious concern to the users of the material. Not only does the tacky surface greatly retard the manufacturing processes and thus increase the expense, but it results in loss from spoilage. Heretofore, attempts have been made to overcome this difficulty by applying to the surface a powder which will adhere to it and has to be removed by washing. It has been customary to dust the surface with powdered borax, bicarbonate of soda, or the like, as the material is manufactured and on arrival at the laminating plant to submit the sheets to a washing operation to dissolve off the powder. This involves not only the expense of the powder and the labor of applying the powder, but also that of washing it off and subsequently drying the sheet. Furthermore, the powder, such as borax and bicarbonate of soda, sometimes becomes embedded in the material so that particles of it are not completely removed by washing. Such particles cause the serious defect known as haze in the finished article.

I have discovered that while these polyvinyl acetal resin plastics are extremely tacky, sticky and adherent to themselves, and certain other substances, they adhere only slightly to cellulose acetate sheeting, preferably but not necessarily plasticized, regenerated cellulose sheeting, and certain kindred substances even when subjected to substantial pressure. The third class of materials comprises those based on thermo-setting resins such as phenolic resins, urea formaldehyde resins which are conveniently applied as impregnated sheets, but I do not find these as satisfactory as the above-mentioned cellulose acetate and regenerated cellulose sheets. Accordingly, I apply a thin coating of them to the surface of a flexible base such as paper or cloth to form an interlayer to be placed between superposed layers of polyvinyl acetal resin plastic.

The invention will be further understood from the drawing: in which

Figure 1:
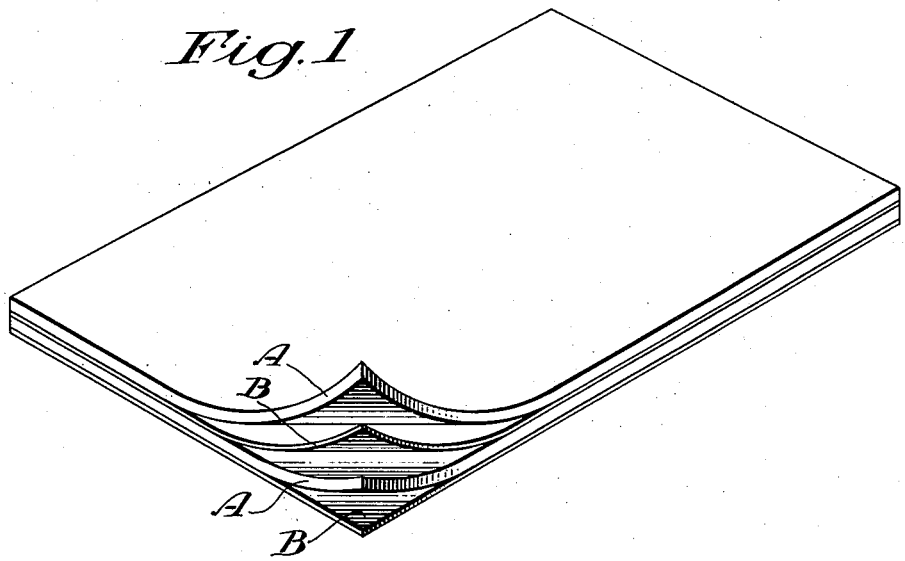
Fig. 1 shows a pack of sheets of polyvinyl acetal resin plastic interleaved with sheets of coated fibrous material in accordance with this invention.

By pack I intend to mean a pile of alternating sheets of plastic and interleaf material, one sheet of each being the minimum, such as shown in Fig. 1, for example, where A designates the safety glass plastic sheets of polyvinyl acetal resin plastic and B the interleaf sheets in accordance with this invention.

Figure 2:
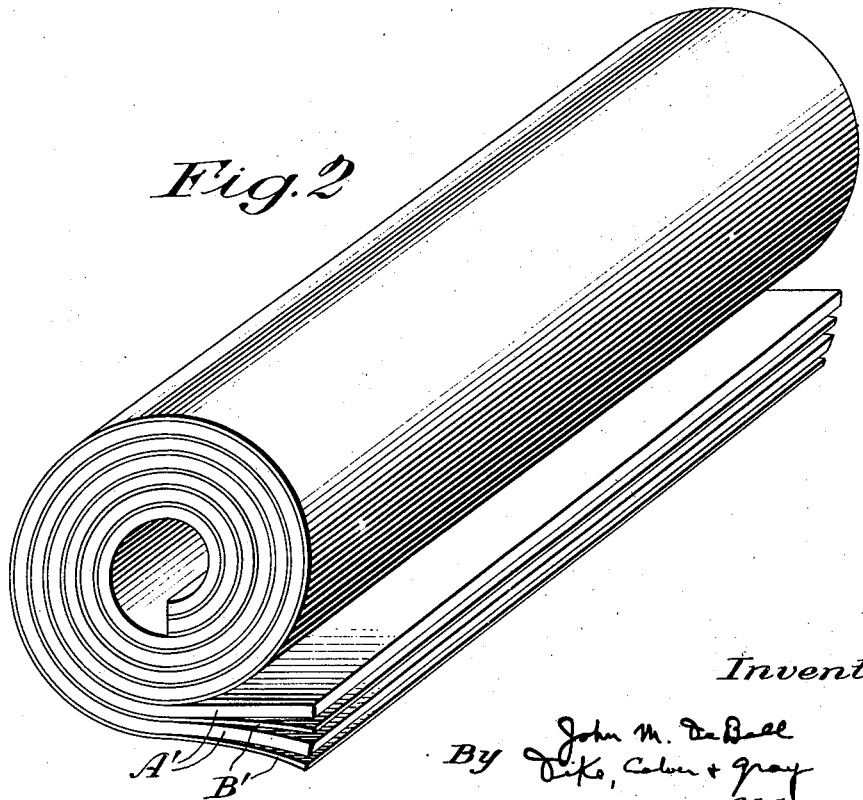
Fig. 2 shows a roll of polyvinyl acetal resin plastic interleaved with paper coated with cellulose acetate.

Referring now to Fig. 2, there is shown a roll of safety glass plastic sheet A' of polyvinyl acetal resin made with butyraldehyde and plasticized with dibutyl phthalate. In this case, the interleaf B' is kraft paper coated with cellulose acetate plastic consisting of cellulose acetate and suitable plasticizers such as tributyl phosphate and diethyl phthalate.

The following are illustrative specific examples:

(1) A continuous safety glass plastic of 100 pts. of Butvar and 43 pts. of triethylene glycol dihexoate is separated by one sheet of .003" water finished kraft paper, carrying a coating on each side 1½ to 3 pounds per ream of a cellulose acetate composition, consisting of 66 pts. cellulose acetate, 17 pts. triphenyl phosphate, 17 pts. diethyl phthalate.

(2) A similar plastic is separated by two sheets of .003" kraft paper, each carrying a coating on the side toward the composition 1½ to 3 pounds per ream of a cellulose acetate plastic consisting of 100 pts. cellulose acetate, 25 pts. triphenyl phosphate, 25 pts. diethyl phthalate.

Where cellulose acetate is employed, it is desirable not to have the proportion of plasticizer exceed the limits given in the above examples and thus to prevent exudation of plasticizer from the interlayer which may cause haze and other difficulties and may develop a tendency to increase the adhesion of the adjacent surfaces of the polyvinyl acetal plastic and the interlayer plastic.

It is to be understood that the present invention is limited to an interliner comprising a coated fibrous sheet as distinguished from an interliner composed entirely of non-fibrous cellulose material.

Other compositions suitable for forming the surface of interlayers for particular polyvinyl acetal plastics may be readily made by those skilled in the art.

Interleaf for safety glass plastic purposes involves very special problems which are not present in standard interleaving for other materials, such as rubber. For example, if the interliner is too smooth the plastic may become so smooth that it will adhere prematurely to glass in assembly; and if the surface of the interliner shows a mottled effect, this may be transmitted sufficiently to the plastic to be visible in the finished safety glass. A fine grained matte finish is preferred for my invention.

I claim:

1. A method for producing laminated safety glass interlayers from polyvinyl acetal resin sheets having extremely sticky and tacky surfaces which comprises contacting at least one surface of the interlayers with a coated fibrous sheet having a fine grained matte finish, said coating comprising an anti-stick material selected from the group consisting of cellulose acetate, regenerated cellulose and a thermosetting resin, whereby premature adhesion of said contacted surfaces of the interlayers to the glass during the assembly of laminated safety glass is prevented.

2. A method for producing laminated safety glass interlayers from plasticized polyvinyl acetal resin sheets having extremely sticky and tacky surfaces which comprises imparting to at least one surface of the interlayers a finish which will prevent premature adhesion of said surfaces to the glass in the assembly of laminated safety glass by impressing upon said surfaces of the interlayers a coated paper sheet having a fine grained matte finish, said coating comprising an anti-stick material selected from the group consisting of cellulose acetate, regenerated cellulose and a thermosetting resin.

3. A method for producing laminated safety glass interlayers from plasticized polyvinyl acetal resin sheets having extremely sticky and tacky surfaces which comprises imparting to at least one surface of the interlayers a finish which will prevent premature adhesion of said surfaces to the glass in the assembly of laminated safety glass by impressing upon said surfaces of the interlayers a coated fibrous sheet having a fine grained matte finish, said coating comprising cellulose acetate.

4. A method for producing laminated safety glass interlayers from plasticized polyvinyl acetal resin sheets having extremely sticky and tacky surfaces which comprises imparting to at least one surface of the interlayers a finish which will prevent premature adhesion of said surfaces to the glass in the assembly of laminated safety glass by impressing upon said surfaces of the interlayers a coated fibrous sheet having a fine grained matte finish, said coating comprising regenerated cellulose.

5. A method for producing laminated safety glass interlayers from plasticized polyvinyl acetal resin sheets having extremely sticky and tacky surfaces which comprises imparting to at least one surface of the interlayers a finish which will prevent premature adhesion of said surfaces to the glass in the assembly of laminated safety glass by impressing upon said surfaces of the interlayers a coated paper sheet having a fine grained matte finish, said coating comprising cellulose acetate.

6. A method for producing laminated safety glass interlayers from plasticized polyvinyl acetal resin sheets having extremely sticky and tacky surfaces which comprises imparting to at least one surface of the interlayers a finish which will prevent premature adhesion of said surfaces to the glass in the assembly of laminated safety glass by impressing upon said surfaces of the interlayers a coated paper sheet having a fine grained matte finish, said coating comprising regenerated cellulose.

7. Laminated safety glass interlayers made from polyvinyl acetal resin sheets having extremely sticky and tacky surfaces, at least one surface of said interlayers having been contacted with a coated fibrous sheet having a fine grained matte finish, said coating comprising an anti-stick material selected from the group consisting of cellulose acetate, regenerated cellulose and a thermosetting resin, whereby premature adhesion of said contacted surfaces of the interlayers to the glass during the assembly of laminated safety glass is prevented.

8. Laminated safety glass interlayers made from plasticized polyvinyl acetal resin sheets having extremely sticky and tacky surfaces, at least one surface of said interlayers having had imparted thereto a finish which will prevent premature adhesion to the glass of said surfaces in the assembly of laminated safety glass by impressing upon said surfaces of the interlayers a coated paper sheet having a fine grained matte finish, said coating comprising an anti-stick material selected from the group consisting of cellulose acetate, regenerated cellulose and a thermosetting resin.

9. Laminated safety glass interlayers made from plasticized polyvinyl acetal resin sheets having extremely sticky and tacky surfaces, at least one surface of said interlayers having had imparted thereto a finish which will prevent premature adhesion to the glass of said surfaces in the assembly of laminated safety glass by impressing upon said surfaces of the interlayers a coated fibrous sheet having a fine grained matte finish, said coating comprising cellulose acetate.

10. Laminated safety glass interlayers made from plasticized polyvinyl acetal resin sheets having extremely sticky and tacky surfaces, at least one surface of said interlayers having had imparted thereto a finish which will prevent premature adhesion to the glass of said surfaces in the assembly of laminated safety glass by impressing upon said surfaces of the interlayers a coated fibrous sheet having a fine grained matte finish, said coating comprising regenerated cellulose.

11. Laminated safety glass interlayers made from plasticized polyvinyl acetal resin sheets having extremely sticky and tacky surfaces, at least one surface of said interlayers having had imparted thereto a finish which will prevent premature adhesion to the glass of said surfaces in the assembly of laminated safety glass by impressing upon said surfaces of the interlayers a coated paper sheet having a fine grained matte finish, said coating comprising cellulose acetate.

12. Laminated safety glass interlayers made from plasticized polyvinyl acetal resin sheets having extremely sticky and tacky surfaces, at least one surface of said interlayers having had imparted thereto a finish which will prevent premature adhesion to the glass of said surfaces in the assembly of laminated safety glass by impressing upon said surfaces of the interlayers a coated paper sheet having a fine grained matte finish, said coating comprising regenerated cellulose.

JOHN M. DE BELL.